(12) United States Patent
Nath

(10) Patent No.: US 6,963,688 B2
(45) Date of Patent: Nov. 8, 2005

(54) ILLUMINATION DEVICE WITH LIGHT GUIDE AND LIGHT DIFFUSER

(76) Inventor: Gunther Nath, Otto-Heilmann-Strasse 3, 82031 Grünewald (DE)

( * ) Notice: Subject to any disclaimer, the term of this patent is extended or adjusted under 35 U.S.C. 154(b) by 0 days.

(21) Appl. No.: 10/909,546

(22) Filed: Aug. 3, 2004

(65) Prior Publication Data

US 2005/0031281 A1 Feb. 10, 2005

(30) Foreign Application Priority Data

Aug. 9, 2003 (DE) .......................... 103 36 654

(51) Int. Cl.[7] .............................. G02B 6/02; G02B 6/00
(52) U.S. Cl. ........................ 385/125; 385/141; 385/142
(58) Field of Search ............................ 385/38, 88, 901; 362/511, 551–582

(56) References Cited

U.S. PATENT DOCUMENTS

| | | | | |
|---|---|---|---|---|
| 5,412,750 A | * | 5/1995 | Nath | 385/125 |
| 5,602,948 A | * | 2/1997 | Currie | 385/33 |
| 6,314,226 B1 | * | 11/2001 | Nath | 385/125 |
| 6,398,778 B1 | * | 6/2002 | Gu et al. | 606/15 |
| 6,418,257 B1 | * | 7/2002 | Nath | 385/125 |
| 6,507,688 B1 | * | 1/2003 | Nath | 385/125 |
| 2004/0137258 A1 | * | 7/2004 | Utsumi et al. | 428/629 |

* cited by examiner

Primary Examiner—Frank G. Font
Assistant Examiner—Charlie Peng

(57) ABSTRACT

The present invention relates to an illumination device comprising light source and a light guide coupled thereto, preferably a liquid light guide, the light exit end of which is provided in the form of a light diffuser, said light diffuser comprising a polymer, preferably a fluorocarbon polymer. The scattering effect of the diffuser is obtained because of its crystalline structure or by fluorescent additives in the polymer. The crystallinity may be inherent to the internal structure of the polymer itself and/or be created or varied by compounding the polymer with other materials. The diffuser is welded to the sheathing tube of the liquid light guide simultaneously providing the seal for the liquid at the distal end of the liquid light guide. A preferred use of the illumination device is photodynamic diagnostics and therapy in the field of medicine.

39 Claims, 1 Drawing Sheet

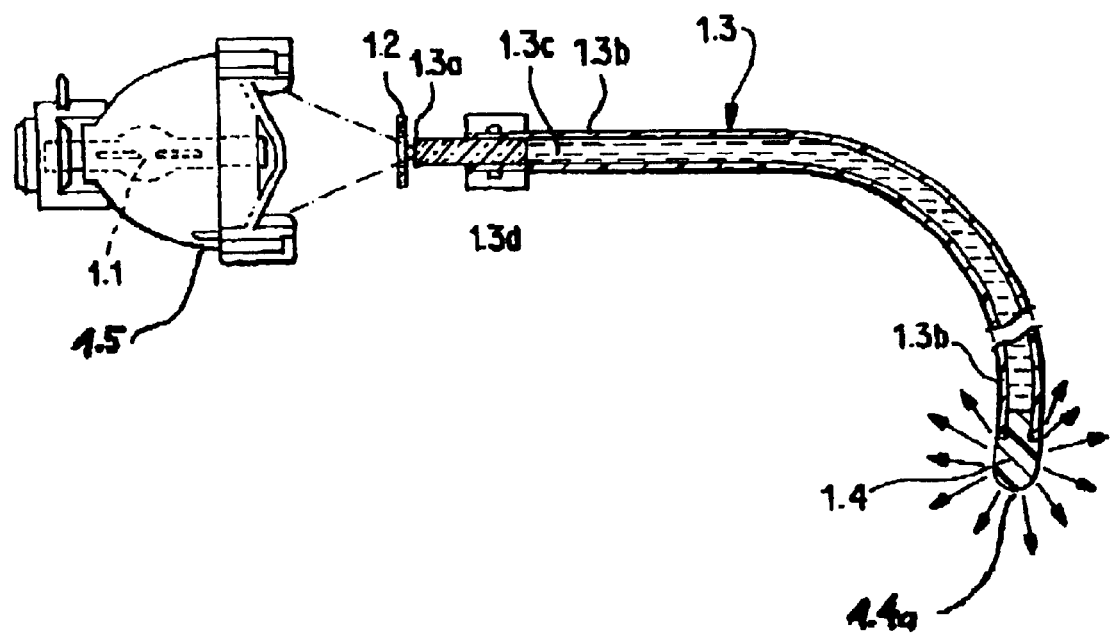

ILLUMINATION DEVICE WITH LIGHT GUIDE AND LIGHT DIFFUSER

Illumination devices with light sources and liquid light guides are known from e.g. patent specifications of U.S. Pat. Nos. 4,009,382 and 5,412,750 and form the basis of the present invention. In medicine, the liquid light guides and illumination devices described in the above-mentioned patent specifications are for example used for endoscopic illumination. A more recent medical use of radiation application by means of liquid light guides is the diagnosis and therapy of bladder carcinoma in combination with light-sensitive dyes. The technical term for this relatively recent development in the medical arts is PDT (photodynamic therapy). A review article of PDT especially in the field of urology has been published in the magazine Laser +Photonik 03/2002, p. 30–32. This article also describes the advantageous use of liquid light guides during photodynamic fluorescence diagnosis. In urology, there is a need for an optically light-guiding catheter for therapeutic purposes, said catheter being able to illuminate the bladder evenly from the inside. Although such catheters based on fiber optics are being used today, predominantly together with laser light sources at the catheter entry, they leave a lot to be desired in many respects.

Such a light-guiding urological catheter has to meet the following requirements:

a) The catheter must have a high optical transmission capacity in the spectral range of about 300–700 nm, possibly in connection with traditional, non-coherent light sources (e.g. xenon, mercury or tungsten halogen lamps), since laser light sources are still very expensive.

b) It must be able to transmit nigh light outputs in the output range up to 10 W.

c) It must be flexible and have a maximum diameter just permitting the introduction into the urethra. This results in a maximum outer diameter of about 4–5 mm.

d) The catheter must have a locally defined light diffuser at the light exit end, said light diffuser, if possible, radiating evenly to the entire spherical angle $4\pi$ without heating up due to radiation absorption, but only radiating diffusely by means of multiple scattering processes.

e) If possible, the catheter should be provided in the form of a disposable article, i.e. its production must be technically simple and inexpensive.

The present invention describes such a catheter, based essentially on a known liquid light guide, the core of the invention focusing on the arrangement of the light diffuser and its leak-proof and pressure-resistant connection to the distal end of the liquid light guide.

In connection with the catheter according to the invention there is further disclosed an illumination device having a traditional light source, said illumination device permitting photodynamic diagnosis and therapy in urology, the distal end of said catheter radiating scattered light in the spectral range of 300–700 nm and in the output range of several Watts.

The special features of the invention are the material of the diffuse and the connection of said diffuser to the liquid light guide, ensuring that heating of the diffuser or a leakage of liquid is completely avoided at the distal end of the liquid light guide, when it is inside a body, even when the internal pressure of the liquid increases. Moreover, it is ensured that the catheter can be introduced into the bladder without complications.

The invention is explained in greater detail below and with reference to several embodiments and the single FIGURE.

In general, a regular liquid light guide (1.3), as can be used in the present invention, consists of a flexible sheathing tube (1.3b) made of a fluorocarbon polymer, such as, f.e., Teflon® FEP or Hyflon® MFA, said sheathing tube being filled with a concentrated aqueous solution (1.3c) of an inorganic salt, such as for example $CaCl_2$, said sheathing tube (1.3b) having an optical refractive index of 1.34–1.35 and said aqueous solution having an optical refractive index of about 1.43–1.44. According to DE 42 33087.4 the inner surface of the sheathing tube (1.3b) nay be coated with a thin layer of a fluoropolymer with an even lower refractive index, for example with Teflon® AF (n=1.29–1.31). The aqueous salt solution may also contain $D_2O$ instead of $H_2O$ (confer DE 19508752.6), or the liquid (1.3c) may contain or consist of monoethylene, diethylene, triethylene or tetraethylene glycol, to which a little $H_2O$ or $D_2O$ (about 6–12%) has been added, (confer P 3523243.9), or said liquid may contain or consist of a highly refractive silicone oil containing phenyl groups (P 3704872.4). The sheathing tube (1.3b) may also be made of Hostaflon® THV or other thermoplastic fluoropolymers (confer P 3772256.5).

Usually, oblong, optically polished $SiO_2$ glass cylinders (1.3a) having an outer diameter equal to or slightly larger than the inner diameter of the tube (1.3b) are pressed into both ends of the tube filled with liquid in order to ensure a seal without gas pockets. The $SiO_2$ cylinders are mechanically compressed with the tube (1.3b) by means of external sealing flanges (1.3d) not described herein.

Of course, sealing flanges (1.3d) increase the outer diameter of the light guide considerably, and therefore they cannot be used for the liquid light guide catheter (LLG catheter) according to the invention, at least at the distal end, especially for the desired use herein in urology.

Thus, a distal diffuser end piece (1.4) of the LLG catheter has to fulfill the following criteria:

1) The diffuser end piece (1.4) must seal off the liquid. The connection between the diffuser end piece (1.4) and the LLG catheter must be completely tight despite the lack of an external sealing flange, even when the internal pressure of the liquid in the LLG catheter may rise considerably during the transmission of high light outputs in the range of several Watts due to the heating of the liquid.

2) If possible, the diffuser end including a seal must not increase the diameter of the LLG catheter, in order not to impede or hinder the introduction into narrow openings (urethra, biopsy ducts for endoscopes).

A conceivable illumination device with the LLG catheter (1.3) according to the invention is illustrated in FIG. 1.

A LLG catheter (1.3) having the diffuser end piece (1.4) according to the invention is provided with a cylindrically shaped bar preferably made of a preferably thermoplastic fluorocarbon polymer at the distal light exit end instead of a cylindrical window made of $SiO_2$ glass, said rod being pressed into the light guide sheathing tube (1.3b), whereafter it is thermally welded to the sheathing tube (1.3b). The fluorocarbon polymer distally sealing the sheathing tube herein instead of a $SiO_2$ window must have the following properties:

1) As the material of the sheathing tube, it must be thermoplastic material.

2) It must have a similar melting temperature, i.e. it must be thermally weldable to the sheathing tube material of the liquid light guide.

3) It must effectively scatter the light transmitted by the light guide in a spectral range of 300–700 nm, if possible completely, with a radiation path length from only a few millimeters to a maximum of several centimeters (depending on the use). Therefore, it must have scattering centers and may not be completely transparent or amorphous.

If the fluorocarbon polymer, from which the diffuser (1.4) is made, is partially crystalline, the desired property of light-scattering has been provided. The light-scattering rate may be controlled by the degree of crystallinity of the polymer, but also by crystalline additives to the fluorocarbon polymer, comprising for example PTSE powder, $BaSO_4$ powder, $SiO_2$ sand or pyrogenic $SiO_2$ or other glass powder, or $TiO_2$ powder or any other light-scattering, but not radiation-absorbing materials able to be compounded with the basic fluorocarbon polymer material of the diffuser (1.4). The diffuser end piece (1.4) of the LLG catheter according to the invention may be manufactured as follows:

The fluorocarbon polymer of the diffuser (1.4) is initially present in the form of a granulate. This granulate, either pure and partially crystalline or admixed with light-scattering additives (compounded), may be manufactured into cylindrical round bars by means of extrusion molding, said bars being cat into sections of smaller cylindrical pieces by means of a sharp tool. The cylindrical pieces may have a length from about 1 mm up to several centimeters and a diameter of about 1–5 mm, corresponding to the inner light-active diameters of the liquid light guides used.

The round bars have an outer diameter corresponding to the inner diameter of the light guide sheathing tube (1.3b) so that the cut cylindrical pieces can be pressed into the open distal end of the light guide sheathing tube (1.3b), said bars being usually pressed in, until they flush with the end of the sheathing tube (1.3b).

Then, the sheathing tube (1.3b) is welded to the pressed cylindrical piece, for example by means of a thermally heated tool under circumferential pressure. This process provides a homogenous, completely sealed and reliably strong terminal cover for the LLG catheter simultaneously providing the light-scattering light diffuser.

During welding or even prior to welding or after welding the diffuser may be given a for example torpedo-like rounded tip (1.4a), or the form of a small sphere, or the form of a flattened, sphere or the form of a tapering, needle-like tip (interstitial application), by means of thermal or mechanical shaping.

With certain, also non-urological applications, e.g. in the gastrointestinal tract, it may be advantageous to form a more oblong diffuser end piece having a length of up to several centimeters.

Thus, the diffuser end piece may be provided with an extension in length of from a few millimeters up to several centimeters. There is a variety of available fluorocarbon polymers and copolymers weldable to the sheathing tube (1.3b) of the liquid light guide, the latter being predominantly made of Teflon® FEP or Hyflon ®MFA or Teflon® PFA, with or without an internal layer of Teflon® AF. With the exception of a few amorphous modifications, the fluorocarbon polymers are all more or less partially crystalline so that the most suitable of the fluorocarbon polymers may be selected depending on the use. Thus, a light diffuser having a length of several centimeters has a lower degree of crystallinity than a diffuser having a length of only a few millimeters so that the diffuser radiates as evenly and completely as possible over its longitudinal axis. Teflon® PTFE has the highest crystallinity (~50%) and thus the highest scattering effect per unit volume, while PTFE copolymers are less crystalline and are better suited to diffusers radiating light over a length of at least several millimeters and more. PTFE copolymers are also easier to weld to the sheathing tube (1.3b) of the LLG, as they are thermoplastic materials with melting temperatures in the range of the melting temperature of Teflon® FEP, the preferred sheathing material for liquid light guides. PTFE is a duroplast and it is therefore more difficult and time-consuming to thermally seal it to the sheathing tube (1.3b).

The diffuser end according to the invention contains or is preferably mace of one or more of the following fluorocarbon polymers:

Teflon® PTFE: polytetrafluoroethylene
Teflon® FEP: copolymer of tetrafluoroethylene and hexafluoropropylene
Hyflon® MFA: copolymer of tetrafluoroethylene and perfluoroinethylvinyl ether
Teflon® PFA: copolymer of retrafluoroethylene and perfluoropropylvinyl ether
Teflon® PCTFE: homopolymer of polychlorotrifluoroethylene
Teflon® ETFE: copolymer of tetrafluoroethylene and ethylene
Teflon® ECTFE: copolymer of ethylene and chlorotrifluoroethylene
Hostaflon® THV: terpolymer of tetraflqoroethylene, hexafluoropropylene and vinyladene fluoride
Teflon® PVDF: polyvinylidene fluoride
Teflon® PVF: polyvinyl fluoride
as well as: copolymers of vinylicene fluoride and trifluorared ethylene chloride, copolymers of vinylidene fluoride and propylene hexafluoride and fluorosilicone polymers.

It is also conceivable that the diffuser end is made of or contains a polymer which is not a fluorocarbon polymer, but consists of a regular hydrogen-containing fluorine-free polymer, such as polyethylene, polypropylene, Makralon®, polystyrene, polymethylmetacrylare, epoxy, polyamide. This requires that they can be welded to the sheathing material of the LLG. Since the melting points of hydrocarbon polymers are usually lower than the melting points of fluorocarbon polymers, it is mostly not possible to weld said hydrocarbon polymers to Teflon® FEP, the preferred sheathing material for LLGS. However, it is possible to weld said hydrocarbon polymers to certain modifications of Hostaflon® THV with a low melting point. Since regular hydrocarbon polymers also nave a partially crystalline, i.e. light-scattering, structure, such polymers may also be used as diffuser end pieces for liquid light guides in the manner according to the invention described herein.

The diffuser end piece according to the invention is manufactured for example in the following steps:

1. The sheathing tube of the LLG is filled with a light-guiding liquid (1.3c), until the level of the liquid is a few millimeters or centimeters below the distal end of the LLG. For a while, the level of the liquid is maintained in this position.
2. The dry cylinder-shaped diffuser end piece is pressed into the equally dry open distal end of the sheathing tube, either flush or not completely flush. Thus, there is a gas pocket between the diffuser end piece and the surface of the liquid acting as thermal insulation of the liquid during welding.
3. Then, the diffuser is welded thermally to the sheathing tube. After welding the gas pocket having a diameter of a few millimeters can easily be moved to the light entrance end of the LLG, said end being subsequently sealed in a conventional manner by pressurizing the liquid without leaving gas pockets.

In a specific embodiment of the LLG catheter according to the invention the LLG sheathing material is made of Teflon® FEP. The sheathing tube has a length of about 2500 mm, an inner diameter of 3 mm and an outer diameter of 4 mm. The FEP tube may be provided with a thin (d ~2 $\mu$m) inner layer of Teflon® AF. The light diffuser welded to the distal end of the FEP sheathing tube has a length of about 10 mm and a torpedo-like rounded tip and is made of Teflon® FEP or Teflon® PFA, or Hyflon® MFA The sheathing tube (1.3b) may also be made of Hyflon® MFA, Teflon® PFA or Hostaflon® THV instead of Teflon® FEP. The sheathing tube (1.3b) should be made of a fluorocarbon polymer having a refractive index of n<1.4. The liquid (1.3c) may be a concentrated aqueous solution of an inorganic salt, e.g. $CaCl_2/H_2O$, where light water $H_2O$ may be completely or partially replaced by $D_2O$. The refractive index of the salt solution is for example in the range of 1.420<n<1.460.

However, the liquid (1.3c) may also consist of monoethylene, diethylene, triethylene or tetraethylene glycol or may contain one of these substances. The liquid (1.3c) may also consist of a highly refractive (n>1,42) silicone oil containing phenyl groups. Although photodynamically not so stable, the stability is sufficient, especially if the LLG catheter is used as a disposable catheter. A complete illumination device consisting of an optical light source (1.1) with optically coupled light guide (1.3) is illustrated in FIG. 1. Here, the light source may for example be a mercury ultra high-pressure lamp having a mercury vapor pressure of up to 200 atmospheres (beamer lamp or VIP lamp (available from Osram)), the plasma of said lamp being in a first focal point of an ellipsoid reflector coated in such a way as to reflect the effective radiation of about 300–700 nm as much as possible, transmitting said radiation into the LLG catheter (1.3), the light incidence area of said catheter being arranged in the second focal point of the ellipsoid reflector.

An optical filter (1.2) may be required to filter out undesirable short-wave UV radiation and/or undesirable long-wave IR radiation, or transmitting only a limited spectral band The lamp (1.1) may have an electric input range of several hundred Wart. Suitable light source are the VIP® lamps available from Osram (120 W, 200 W, 250 W, 300 W) with integrated elipsoid reflectors, as for example, HXP® R 120 W/45 C VIS or VIP R 120/P12 or similar lamps from Philips called UHP lamps or from other producers.

However, it is also conceivable to use xenon ultra high-pressure lamps with focusing devices as light sources.

In addition, a laser source, e.g. in the form of a semiconductor diode laser with an output in the Watt range, is a suitable light source. Such laser sources are being used for photodynamic therapy, especially in the red spectral range, for example at $\lambda$=630 nm. Because of the large penetration depth of red light into tissue, this wavelength is often used in photodynamic therapy. Short-wave radiation, such as blue light, may also be used in photodynamic therapy, in particular when a small penetration depth is desired.

When using the considerably less expensive VIP lamps having main emissions In the blue, green and UVA spectral range and the yellow and red spectral ranges almost completely missing, it may be advantageous to supplement the diffuser by adding yellow and red fluorescing organic colorants or yellow or red fluorescing inorganic crystalline substances to the polymer of the diffuser end piece in order to enhance the yellow and red spectral ranges. Such fluorescent colorants can absorb part of the UVA radiation and blue light of the beamer lamp, converting it into yellow or red fluorescent light, which is then also radiated to the entire spherical angle. Here, however, a heating of the diffuser end piece has to be taken into account, sail heating not occurring when the light is exclusively scattered by the crystalline structures. Such admixed colorants may for example be perylenes (Lumogen® red) or rhodamines or crystalline powders, such as yttrium aluminum granate doped with cerium (YAG:Ce), the latter emitting in the yellow range (575 nm) upon excitement in the blue spectral range. In general, rare earths may be used as inorganic colorants, said rare earths possessing the desired spectral properties mainly in the form of oxides in crystalline or amorphous inorganic matrix materials.

What is claimed is:

1. Illumination device comprising a light source (1.1) with an optically coupled light guide (1.3), the light guide being a flexible liquid core light guide formed by a tube-like sheath and a liquid condensed therein, wherein the distal light exit end of the light guide is provided in the form of a light diffuser (1.4), said light diffuser being made of or containing a polymer having a light-scattering internal structure, and wherein the light diffuser is thermally welded to the sheath of the liquid light guide and simultaneously provides the distal sealing element of the liquid light guide.

2. Illumination device according to claim 1, wherein the polymer is a thermoplastic material.

3. Illumination device according to claim 1, wherein the polymer is a fluorocarbon polymer.

4. Illumination device according to claim 1, wherein the diffuser (1.4) is rotationally symmetric with respect to the axis of the light guide (1.3).

5. Illumination device according to claim 1, wherein the diffuser (1.4) has a diameter approximately equal to the inner diameter of the plastic sheath (1.3b) of the liquid light guide (1.3).

6. Illumination device according to claim 1, wherein the diffuser (1.4) has a torpedo-like shape (1.4a) rounded at the tip.

7. Illumination device according to claim 1, wherein the diffuser (1.4) has an essentially cylindrical geometry with rounded edges.

8. Illumination device according to claim 1, wherein the melting temperature of the diffuser material is approximately equal to the melting temperature of the sheath material of the liquid light guide.

9. Illumination device according to claim 1, wherein the sheath (1.3b) of the liquid light guide is provided in the form of a double sheath and consists of two plastic materials and the diffuser (1.4) has a welded connection with at least one of said two plastic materials of the sheath (1.3b).

10. Illumination device according to claim 1, wherein the diffuser (1.4) contains or is made of a partially crystalline thermoplastic fluorocarbon polymer.

11. Illumination device according to claim 1, wherein the diffuser (1.4) contains or is made of one of the materials of Teflon® PTFE, Teflon® FEP, Hyflon® MFA, Teflon® PFA, Teflon® PVDF, Teflon® PCTFE, Hostaflon® THV.

12. Illumination device according to claim 1, wherein the diffuser material is made of a TFE copolymer or contains such a copolymer.

13. Illumination device according to claim 1, wherein the diffuser (1.4) contains a partially crystalline or amorphous fluorocarbon polymer, a light-scattering crystalline or partially crystalline material being further added to said polymer by the method of compounding.

14. Illumination device according to claim 13, wherein the additional light-scattering material contains or consists of one or more of the materials Teflon® PTFE, BaSO$_4$, TiO$_2$ or glasspowder, f.e., SiO$_2$.

15. Illumination device according to claim 1, wherein the diffuser contains a fluorescent colorant.

16. Illumination device according to claim 15, wherein the fluorescent colorant contains an organic colorant molecule.

17. Illumination device according to claim 15, wherein the colorant contains an inorganic molecule in an inorganic crystalline or amorphous matrix.

18. Illumination device according to claim 17, wherein the inorganic molecule contains an element of the group of rare earths.

19. Illumination device according to claim 18, wherein the colorant contains pulverized yttrium aluminum granate doped with cerium.

20. Illumination device comprising a radiation source and a light-guide coupled to the radiation source according to claim 1, wherein the light-guide is a liquid core light-guide having a tube-like cladding containing a fluorocarbon polymer and having a diffusion element containing also a fluorocarbon polymer, wherein the diffusion element is thermally welded to the cladding tube, thereby forming a distant sealing element of said liquid core light-guide.

21. Illumination device according to claim 20, wherein the radiation source consists of a laser or of a non-coherent gas discharge lamp like Xe or Hg discharge lamp.

22. Illumination device according to claim 20, wherein the radiation source consists of a beamer lamp in the power range between 100 and 300 W electrical power, with integrated elliptoidical reflector.

23. Illumination device according to claim 22, wherein the beamer lamp is of the type of an Osram VIP lamp.

24. An illumination device, comprising a flexible liquid core light guide including a tube-like sheath and a liquid contained therein, one end of said liquid core light guide being closed and adapted to be coupled to a light source, and further means for fluid-tight sealing the other end of said light guide including a diffuser means separate from said light guide and having a light-scattering internal structure, said diffuser means having a substantially cylindrical body portion matched to the internal diameter of the tube-like sheath, being pressed into the tube-like sheath and being thermally welded to said tube-like sheath.

25. An illuminating device according to claim 24, wherein said tube-like sheath and said diffuser means have similar melting temperatures.

26. An illuminating device according to claim 24, wherein said diffuser means is made of or contains a polymer.

27. An illumination device according to claim 26, wherein the polymer is a fluorocarbon polymer.

28. An illumination device according to claim 27, wherein the diffuser means contains or is made of one of the materials of Teflon® PTFE, Teflon® FEP, Hyflon® MFA, Teflon® PFA, Teflon® PVDF, Teflon® PCTFE, Hostaflon® THV.

29. An illumination device according to claim 27, wherein the material of the diffuser means is made of a TFE copolymer or contains such a copolymer.

30. An illumination device according to claim 27, wherein the diffuser means contains a partially crystalline or amorphous fluorocarbon polymer, a light-scattering crystalline or partially crystalline material being further added to said polymer by the method of compounding.

31. An illumination device according to claim 30, wherein the additional light-scattering material contains or consists of one or more of the materials Teflon® PTFE, BaSO$_4$, TiO$_2$ or glass powder, f.e., SiO$_2$.

32. An illumination device according to claim 27, wherein the diffuser contains a fluorescent colorant.

33. Illumination device according to claim 32, wherein the organic colorant molecule is derived from the group of perylenes or rhodamines.

34. An illumination device according to claim 32, wherein the colorant material contains a fluorescent colorant material or is derived from the group of perylenes or rhodamines.

35. An illumination device according to claim 32, wherein the colorant material contains an element of the group of rare earths.

36. An illumination device according to claim 32, wherein the colorant material contains pulverized yttrium aluminum granate doped with cerium.

37. A method of manufacturing a liquid-core tube-like flexible light guide for use in an illuminating device, which includes a flexible tube-like sheath with a liquid contained therein, said tube-like sheath being closed in a fluid-tight manner at one end thereof adapted to be coupled to a light source and at the other end thereof by a diffuser separate from said tube-like sheath, comprising the steps of closing said one end, filling said tube-like sheath with a liquid core, pressing the diffuser into the other end of said tube-like sheath, arid thermally welding said diffuser to said tube-like sheath at the other end.

38. A method according to claim 37, wherein said step of filling said tube-like sheath involves only partially filling said tube-like sheath with said liquid so as to leave a small air pocket at said other end acting as insulation during the thermal welding, and removing said air pocket at said one end after completing said thermal welding step.

39. A liquid core tube-like flexible light guide made in accordance with the method of claim 37.

* * * * *